United States Patent [19]

Kirsch et al.

[11] 3,828,247
[45] Aug. 6, 1974

[54] TESTING A FUEL INJECTION VALVE

[75] Inventors: Kalus Kirsch, Rennau; Werner Grotewold, Flechworf, both of Germany

[73] Assignee: Volkswagenwerk Aktiengesellschaft, Wolfsburg, Germany

[22] Filed: June 25, 1973

[21] Appl. No.: 372,942

[30] Foreign Application Priority Data
June 28, 1972   Germany............................ 2231630

[52] U.S. Cl............................. 324/28 R, 73/119 A
[51] Int. Cl........................................... G01r 31/02
[58] Field of Search .... 73/119 A; 324/28 R, 28 CB, 324/158 MG; 317/DIG. 6

[56] References Cited
FOREIGN PATENTS OR APPLICATIONS
522,651   4/1955   Italy................................. 73/119 A

*Primary Examiner*—Alfred E. Smith
*Assistant Examiner*—Rolf Hille
*Attorney, Agent, or Firm*—Brumbaugh, Graves, Donohue & Raymond

[57] ABSTRACT

An electromagnetic device such as a fuel-injection valve is tested by monitoring the variation in the impedance of the electric coil of the device as it operates. The change in impedance of a properly-operating device can be converted into a generally decaying voltage signal with a series of small voltages peaks. An inoperative device will not produce these voltage peaks. The voltage peaks are converted into pulses and then counted. If more than two pulses are detected the device is operating properly.

15 Claims, 9 Drawing Figures

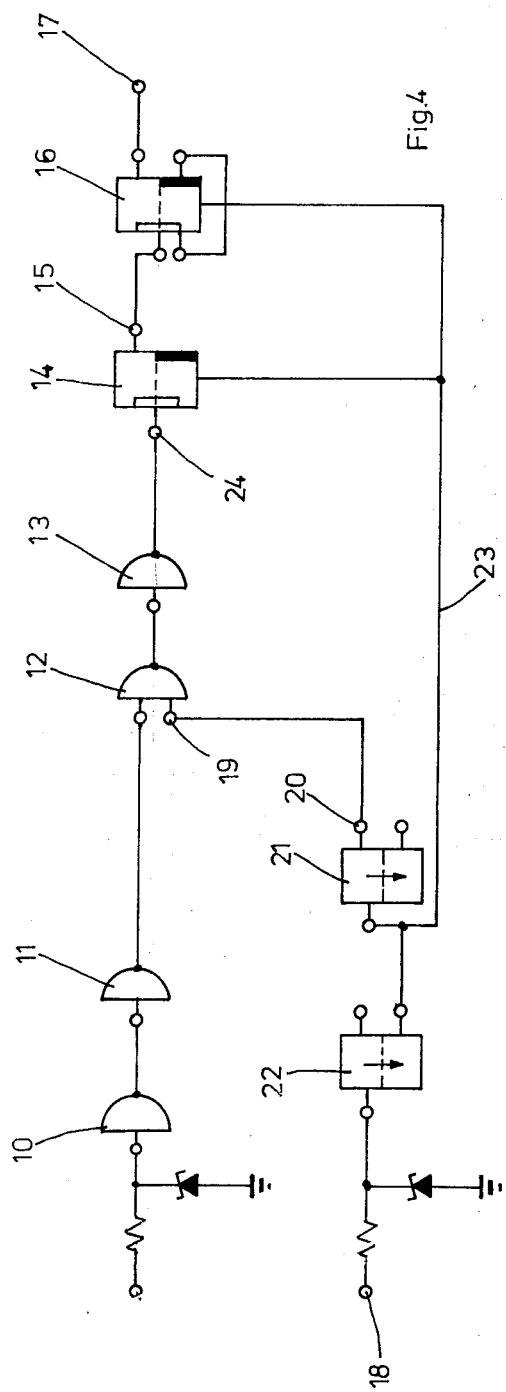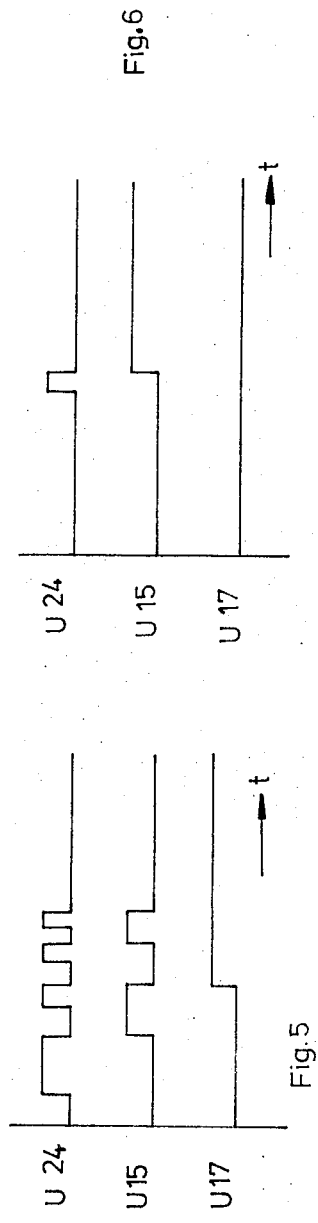
Fig.4
Fig.5
Fig.6

TESTING A FUEL INJECTION VALVE

BACKGROUND OF THE INVENTION

This invention relates to testing of an electromagnetic device and, more particularly, to a novel and highly-effective method and apparatus facilitating the testing of a fuel-injection valve for an internal-combustion engine.

Some fuel-injection valves contain a magnetic coil and an armature that is mechanically connected to a movable body in the valve. Between successive injections, this movable body or valve needle is forced against a valve seat surrounding the valve opening by a spring, thereby closing the valve to the flow of fuel. The application of an electric current to the magnetic coil of the valve will cause the movable body to move axially against the force of the spring, thus opening the valve. Valves constructed in this manner are subject not only to electrical problems such as short circuits, but also to corrosion due to water and other foreign substances in the fuel passing through the valve. This corrosion reduces the mobility of the movable body in the valve and ultimately renders it ineffective.

SUMMARY OF THE INVENTION

An object of this invention is to provide a method and apparatus facilitating the functional testing of electrogmagnetic valves, whereby electrical and mechanical faults can be detected without the need to disassemble the valve.

In an illustrative embodiment of the invention the magnetic coil of the device under test is supplied with a constant current for a period of time. This causes the movable body or valve needle to move until it clears the opening in the valve body. During the motion of the valve needle the voltage across the magnetic coil will have a generally downward slope. However, when the coil is first energized and again when the needle valve strikes a mechanical stop in the valve body, peaks in the voltage will be produced. After the peak produced when the needle strikes the stop, several other peaks in the voltage will be produced because of the bouncing of the armature as the valve needle bounces against the stop in the valve body.

The voltage across the magnetic coil, during the period when the current is passing through the coil, is applied to a filter circuit which removes its d.c. component. The filtered signal is amplified to emphasize the peaks and is then supplied to a voltage-limiting circuit that converts the peaks into a series of pulses. A digital circuit next counts the number of pulses generated from the signal and indicates when the number is greater than two. In such a case the valve needle is known to have struck the mechanical stop at least once and the valve is considered to be in operating order.

It is also possible to supply a constant voltage to the magnetic coil of the valve as opposed to a constant current. In such a case a variable current will be produced. This variable current can be converted into a suitable voltage by conventional means. Then the filtering, amplifying and counting circuits described for a constant-current pulse can be used to test the valve with this signal derived from a constant-voltage pulse.

BRIEF DESCRIPTION OF THE DRAWING

The foregoing and other features of the present invention will be more readily apparent from the following detailed description of a preferred embodiment thereof and the figures of the appended drawing, in which:

FIG. 4 is a schematic of digital pulse-counting circuits in accordance with the invention;

FIG. 5 is a graph of the voltage waveforms at various points in the circuits when a properly functioning device is tested in accordance with the invention;

FIG. 6 is the same as FIG. 5 except that FIG. 6 represents a test of a device that is functioning improperly;

DESCRIPTION OF THE PREFERRED EMBODIMENTS

Figure 7:
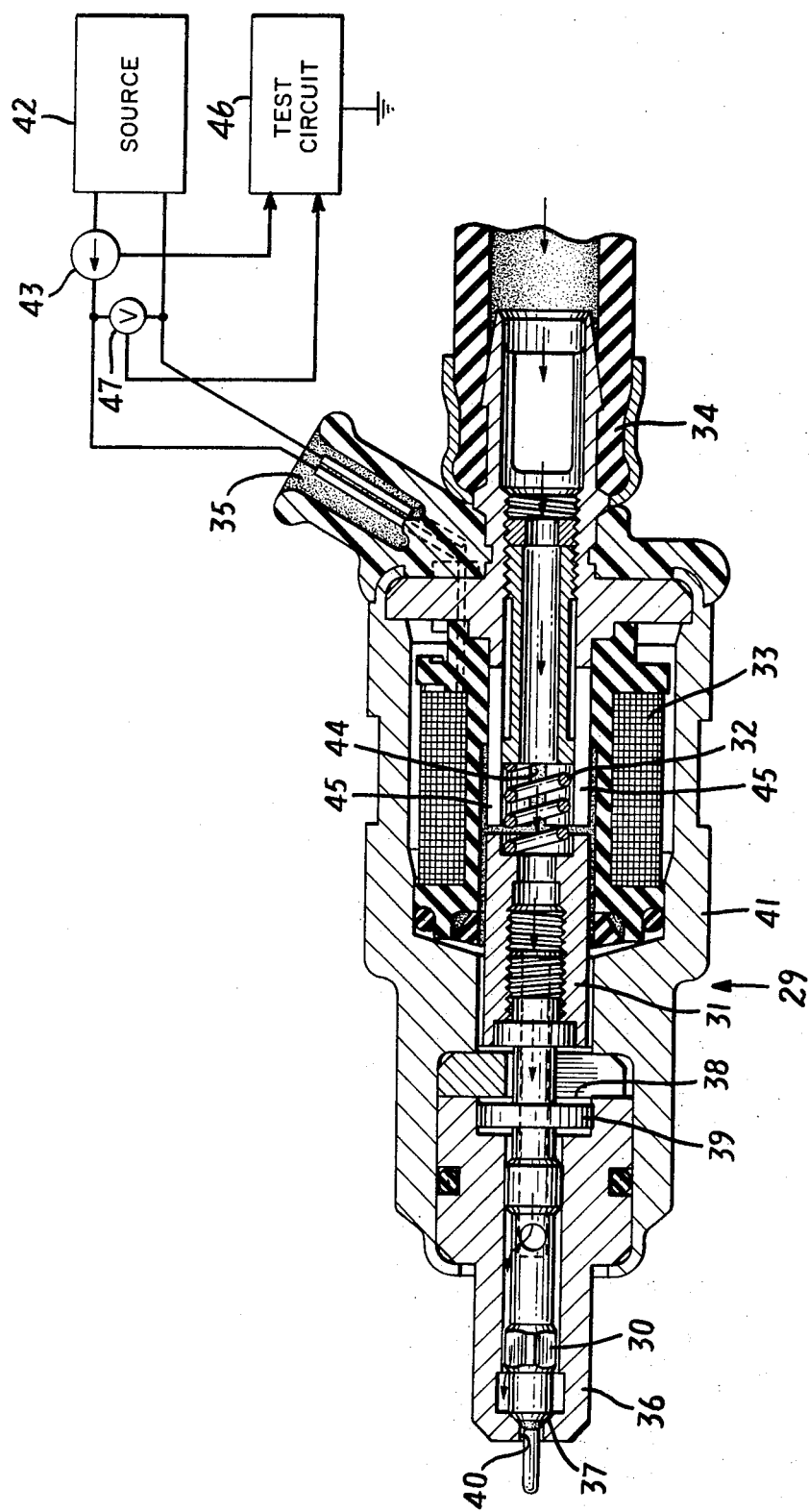
FIG. 7 is a diagram of a representative fuel-injection device intended to be tested in accordance with the present invention.

FIG. 7 shows a fuel-injection valve 29 typical of those employed in the engines of motor vehicles. It comprises a valve body 36 and a valve needle 30 that has its tip forced tightly against a valve seat 37 in the valve body by a compression coil spring 32, thereby tightly closing the valve opening 40. The spring is guided by a radial arrangement of four webs 44 and 45. The valve needle 30 is provided with an armature 31 of material which conducts the magnetic flux generated by a magnetic coil 33. The armature and coil are retained by an outer cover 41. The delivery of an exciting current from source 42 to the magnetic coil will cause the armature 31 together with the valve needle 30 to move in an axial direction (towards the right in FIG. 7) until the valve needle is removed from the valve seat 37 thereby opening the valve itself to the flow of fuel from input line 34. The flow of fuel from line 34 through the valve to opening 40 is indicated by the arrows in FIG. 7.

Figure 1:
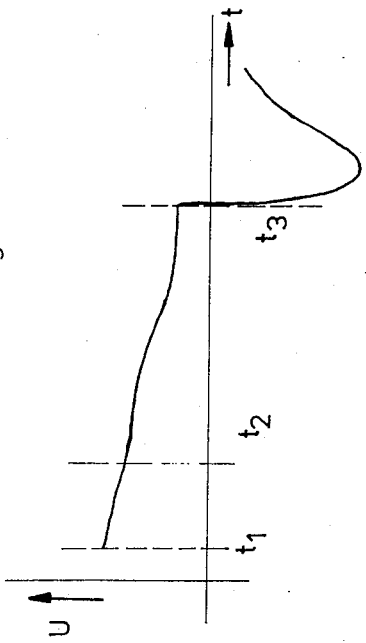
FIG. 1 is a graph of the voltage as a function of time across the magnetic coil when a properly-operating device is tested in accordance with the invention.
Figure 2:
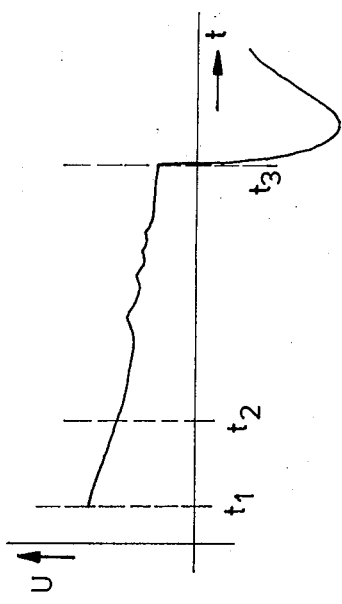
FIG. 2 is similar to FIG. 1 except that FIG. 2 represents a test of a device that has malfunction.
Figure 8:
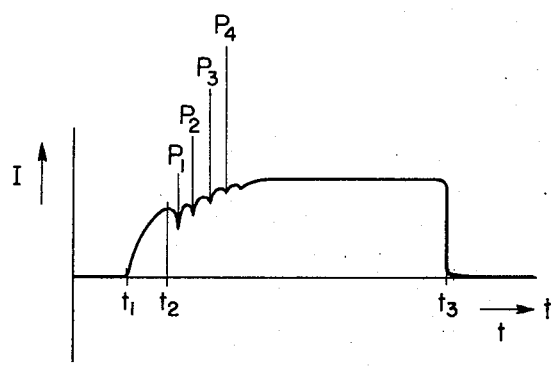
FIG. 8 is a graph of the current as a function of time through the magnetic coil when a constant voltage is applied to a properly operating device.
Figure 9:
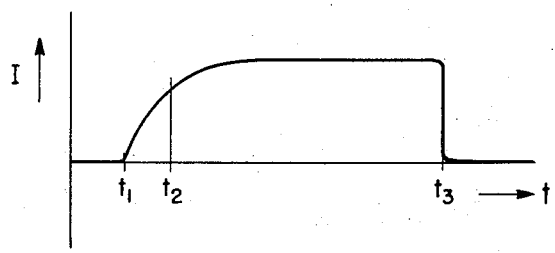
FIG. 9 is similar to FIG. 8 except that it represents a malfunctioning device.

If a constant current or voltage, which can be represented by a rectangular pulse, is fed to the magnetic coil by way of electrical connector 35, the voltage or current respectively, across or through the coil will have a particular shape depending on whether or not the valve functions. FIGS. 1 and 2 show the shape of the voltage U across the magnetic coil during the time when a rectangular current pulse is applied to the magnetic coil. FIGS. 8 and 9 show the shape of the current $i$ through the magnetic coil during the time when a rectangular voltage pulse is applied to the magnetic coil. The curves in FIGS. 1 and 8 are for functioning valve and the curves in FIGS. 2 and 9 are for an inoperative or improperly operating valve. When a constant-current pulse is applied to the magnetic coil the voltage on the coil, represented by U in FIG. 1, rises to a peak at the instant $t_1$ and gradually decays until the time $t_2$. A short time after the instant $t_2$ there is a voltage peak $P_1$ followed by other voltage peaks $P_2$, $P_3$, $P_4$. These peaks are produced when a projection 39 on the valve needle bounces against a stop 38 in the valve body. Since the needle 30 and armature 31 are connected, the armature will also bounce, causing changes in the impedance of the magnetic coil 33 that change the voltage across it.

At the instant $t_3$ in FIG. 1 the current pulse ends, causing the voltage to go negative and then decay to zero. When this happens the spring 32 moves the armature 31 to the left (FIG. 7) and inserts the valve needle 30 in the valve seat 37 once more. During the functional testing of the valve it is advisable to interrupt the delivery of the fluid, for example the fuel in a fuel-injection valve, so that a clearly-defined modification of the voltage on the magnetic coil on termination of the movement of the valve needle 30 can be obtained.

The voltage curve for malfunctioning valve (FIG. 2) does not have the characteristic peaks following instant $t_2$. Since these peaks are associated with the bouncing of the armature as the needle strikes the stop, the absence of the peaks indicates that a malfunction has diminished the mobility of the valve needle and armature, or that there has been an electrical malfunction in the magnetic coil or the connector 35.

In FIGS. 1 and 2 the voltage between instant $t_1$ and $t_2$ does not contain any signals useful for functional testing. Therefore this period may be dispensed with for the purposes of the functional testing in order to reduce the possibility of erroneous signals due to noise pulses.

Figure 3:
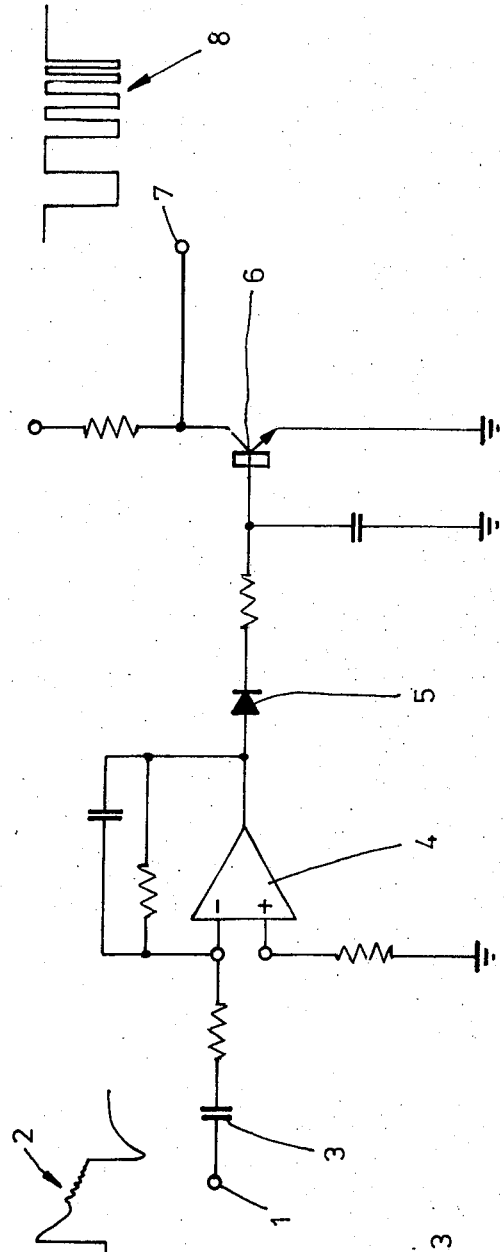
FIG. 3 is a schematic of filtering, amplifying and pulse-shaping circuits in accordance with the invention.

The testing function can also be achieved when a constant voltage pulse is supplied to the coil from source 42 (shown in FIG. 7). In such a case the current through the coil will contain a series of inverted peaks which represent the proper operation of the valve such as $P_5$, $P_6$, $P_7$ and $P_8$ in FIG. 8. This current signal can then be converted into an appropriate voltage signal by device 43 in FIG. 7 and applied to the test circuit 22 of FIG. 7, the details of which are shown in FIG. 3. Alternatively, the circuit of FIG. 3 can be modified to handle the current signal directly. In its simplest form the device 43 may comprise a resistor through which the measuring current flows and across which a voltage proportional to the current is derived. This voltage may be amplified and inverted so that the current wave form of FIG. 8 appears like the voltage waveform of FIG. 1. To prevent inaccuricies in the sensing process caused by the voltage drop at the current sensing device and the current flowing through the voltage sensing device, respectively, the voltage sensing device 47 and the current sensing device 43 are not normally used together. That is, with the constant current method only the voltage sensing device 47 will be used and device 43 will be replaced with a short circuit. Also, the output line of device 43 will be eliminated. With the constant voltage method only the current sensing device 43 will be used and the device 47 will be eliminated along with the output line. Also, there will be no direct connection between the ground and signal lines at the point where device 47 was located.

The signal-preparing circuit of FIG. 3 has a filter section for filtering out the d.c. component of the signal from the magnetic coil, an amplifier section and a limiter stage for suppression of those portions of the voltage signal having a polarity opposite the polarity of the voltage peaks. Following the limiter stage there is a gating circuit that converts the voltage peaks in the processed signal into a series of pulses. Therefore several pulses are present at the output of the circuit of FIG. 3 only when the testing valve functions properly. The situation is different for a valve with a malfunction in that there can be a pulse in the region of the time $t_3$ but other pulses will not occur. Accordingly, it is possible to use the number of pulses obtained from the circuit of FIG. 3 as a measure of the condition of the device tested.

The voltage 2 from the magnetic coil of the valve to be tested is delivered to the input terminal 1. The voltage has the shape indicated in FIGS. 1 or 2 depending on the condition of the valve. In FIG. 3, it has been assumed that the valve is operative since the voltage 2 shows the peaks caused by the bouncing of the armature as the needle strikes the stop in the valve body. A capacitor 3 removes the d.c. component from the signal, and the a.c. component is supplied to a conventional amplifier 4. The output of the amplifier 4 is supplied to a rectifier so that only the positive portion of the signal from the amplifier 4 remains for application to the base of a transistor amplifier 6. The transistor 6 acts as a limiter so that the various voltage peaks in the signal appear at output 7 (at the collector of the transistor) in the form of a train of pulses 8 of equal amplitude but unequal duration. When the valve is not operative, only one such pulse results.

In order to determine the number of pulses at output 7 a digital evaluation circuit such as that shown in FIG. 4 is provided. The circuit of FIG. 4 contains two bistable multivibrator stages 14 and 16 connected in series so that a control signal is generated only on the arrival of a second pulse following the first pulse. To clear the operation of the bistable multivibrator stages at the start of a test cycle the voltage form the magnetic coil activates a monostable multivibrator 22 whose output resets the bistable stages. A second monostable multivibrator 21 may be connected in series with the first and its output may be used to block the signals from the evaluation circuit during the period $t_1$ to $t_2$, thereby reducing its sensitivity to noise.

In FIG. 4 the pulse train from output 7 in FIG. 3 is applied to the input 9. The pulses are forwarded to the NAND gate 12 through the Schmitt trigger 10 and the inverter 11 which are connected in series. From NAND gate 12 the pulses are applied to the first bistable multivibrator stage 14 by way of inverter 13. The output 15 of the multivibrator 14 triggers the second bistable multivibrator stage 16 whose output 17 is the output of the entire testing device.

The input 18 of the digital analyzing circuit of FIG. 4 has the entire voltage from the magnetic coil applied to it. Therefore, the terminals 1 and 18 in FIGS. 3 and 4, respectively, are connected. The voltage on terminal 18 is used to trigger monostable multivibrator 22 whose output in turn triggers monostable multivibrator 21. The output 20 of the monostable multivibrator 21 drives the input 19 of the NAND gate 12. These two monostable multivibrators allow the NAND gate 12 to pass the signals from inverter 11 only after the time $t_2$ shown in FIG. 1. Therefore, the time interval between $t_1$ and $t_2$ is not utilized for measuring purposes. As was mentioned previously, the voltage during this time interval does not possess characteristics that relate to the operativeness of the valve. The voltage can therefore be disregarded during this time interval. In addition, the monstable multivibrator 22 acts to reset the bistable multivibrator stages 14 and 16 by way of the reset line 23. This occurs after the voltage on the magnetic coil is removed.

The diagrams in FIGS. 5 and 6 show in the cases where the tested valve is operative and inoperative, respectively, the shape of the voltages U24 at the input 24 of the first bistable multivibrator stage 14, U15 at the output 15 thereof and U17 at the output of the testing device, all as a function of time $t$. The output signal of the signal-preparing circuit of FIG. 3 contains a series of pulses when an operative valve is tested. As a consequence the voltage U24 at the input 24 of the bistable multivibrator stage 14 contains several pulses. The situation is different, however, for a malfunctioning valve. In that case the shape of the voltage, as FIG. 2 shows, has only one peak, and accordingly the voltage U24 has only one pulse, shown in FIG. 6. When an operative valve is tested, the voltage at the output of the bistable multivibrator 15 (indicated as U15 in FIG. 5) has more than one pulse. In this example two pulses have been assumed. Since the one voltage pulse (U24 in FIG. 6) generated when a malfunctioning valve is tested can trigger the bistable multivibrator 14 into its opposite state only once, the voltage U15 at the output of this multivibrator stage contains only one step.

The pulses of the voltage U15 are converted into a control signal at the output 17 by means of the second bistable multivibrator stage 16. When an operative device is tested, the first negative-going edge of a pulse at the output 15 reverses the bistable multivibrator 16, and, in accordance with the last diagram in FIG. 5, a voltage control signal U17 appears at the output 17. Conditions are different for a malfunctioning device, in that the voltage U15 does not contain a negative-going edge, so the potential U17 (FIG. 6) at the terminal 17 (FIG. 4) is not modified. This absence of a potential modification at the terminal 17 characterizes the control signal when the tested valve is inoperative.

The testing method and apparatus for its execution in accordance with the invention ensure an indication not only wherever the ability of the valve to function is impaired by corrosion, but also in case of an electrical defect, since an electrical defect also prevents the generation of peaks in the voltage on the magnetic coil that can be processed by the testing method and apparatus.

While the invention has been particularly shown and described with reference to preferred embodiments thereof, it will be understood by those skilled in the art that various changes in form and details may be made therein without departing from the spirit and scope of the invention. In particular, the invention may be utilized to test the functioning of magnets operating by armature attraction, as well as of electric relays. These devices may be tested even in the absence of a valve body such as that shown. Accordingly, the invention is not limited except by the appended claims.

We claim:

1. A method for the functional testing of an electromagnetic device comprising a magnetic coil, an armature mounted for relative movement with respect to the coil, and a stop for limiting the relative movement, the relative movement being effected by a current flowing through the magnetic coil to produce a magnetic flux coupled to the armature, comprising the steps of:

applying across the coil a substantially constant voltage electrical pulse of such a magnitude that the resulting magnetic flux is capable of effecting said relative movement until limited by said stop;
monitoring the current through the coil to detect the presence of peaks therein; and
generating a control signal in response to said monitoring, which is indicative of the functional state of the device.

2. A method according to claim 1 wherein the monitoring begins after a period of time sufficient to allow the limiting of the relative movement by the stop.

3. A method according to claim 1 wherein the electromagnetic device is a fuel-injection valve for an internal-combustion engine.

4. A method according to claim 3 wherein the flow of fluid through the valve is interrupted during the functional testing.

5. A device for the functional testing of an electromagnetic device comprising a magnetic coil, an armature mounted for relative movement with respect to the coil, and a stop for limiting the relative movement, the relative movement being effected by a current flowing through the magnetic coil to produce a magnetic flux coupled to the armature, comprising:

means for deriving a signal from said coil while a current is passing through it;
signal-processing means for converting peaks in the voltage signal due to the limiting of said relative movement by the mechanical stop into voltage pulses; and
digital evaluating means for counting the voltage pulses and generating a control signal whenever there are more than two pulses.

6. A device according to claim 5 wherein said means for deriving said signal comprises:

means for maintaining the current through the magnetic coil substantially constant; and
means for coupling a voltage produced across the coil by the current passing through it to the signal-processing means.

7. A device according to claim 5 wherein said means for deriving said signal comprises:

means for maintaining the voltage across the magnetic coil substantially constant;
means for converting the current into a derived voltage signal; and
means for coupling the derived voltage signal to the signal-processing means.

8. A device as claimed in claim 5 wherein said signal-processing means comprises:

filter means for filtering out the d.c. component of the signal to form a filtered signal;
amplifier means for amplifying the filtered signal to form an amplified signal;
limiter means for suppressing the portions of the amplified signal having polarity opposite from the polarity of the peaks in the amplified signal; and
gating means for converting the peaks in the amplified and limited signal into pulses.

9. A device according to claim 5 in which said digital evaluating means comprises:

a first bistable multivibrator responsive to the pulses from the signal-processing means; and
a second bistable multivibrator responsive to the output of the first bistable multivibrator, the output of the second bistable multivibrator being the control signal, whereby the control signal is generated only when at least two pulses are received from the signal-processing means.

10. A device according to claim 9 further comprising:

a NAND circuit that receives the pulses from the signal-processing means on one of its inputs;

a first monostable multivibrator responsive to the signal from said means for deriving a signal from said coil; and a second monostable multivibrator responsive to the output of the first monostable multivibrator, the output of the second monostable multivibrator being applied to the other input of the NAND circuit, the form of the outputs from the monostable multivibrators being such that the pulses from the signal-processing means are inhibited from passing through the NAND circuit for the period from just after the voltage signal is present until a time sufficient for the movable body to reach the mechanical stop has elapsed.

11. A device according to claim 10 wherein the output of the first monostable multivibrator resets the bistable multivibrators.

12. A method for the functional testing of an electromagnetic device comprising a magnetic coil, an armature mounted for relative movement with respect to the coil, and a stop for limiting the relative movement, the relative movement being effected by a current flowing through the magnetic coil to produce the magnetic flux coupled to the armature, comprising the steps of:

applying to the coil a substantially constant current electrical pulse of such a magnitude that the resulting magnetic flux is capable of effecting said relative movement until limited by said stop;

monitoring the voltage across the coil to detect the presence of peaks therein; and generating a control signal in response to said monitoring, which is indicative of the functioning of the device.

13. A method according to claim 12 wherein the monitoring begins after a period of time sufficient to allow the limiting of the relative movement by the stop.

14. A method according to claim 12, wherein the electromagnetic device is a fuel-injection valve for an internal-combustion engine.

15. A method according to claim 14, wherein the flow of fuel through the valve is interrupted during the functional testing.

* * * * *